United States Patent
Gammel et al.

(10) Patent No.: US 7,526,655 B2
(45) Date of Patent: Apr. 28, 2009

(54) MICROPROCESSOR CONFIGURATION AND METHOD FOR OPERATING A MICROPROCESSOR CONFIGURATION

(75) Inventors: Berndt Gammel, München (DE); Oliver Kniffler, München (DE); Holger Sedlak, Egmating (DE)

(73) Assignee: Infineon Technologies AG (DE)

( * ) Notice: Subject to any disclaimer, the term of this patent is extended or adjusted under 35 U.S.C. 154(b) by 824 days.

(21) Appl. No.: 10/197,792

(22) Filed: Jul. 18, 2002

(65) Prior Publication Data

US 2003/0005314 A1    Jan. 2, 2003

Related U.S. Application Data

(63) Continuation of application No. PCT/DE01/00018, filed on Jan. 5, 2001.

(30) Foreign Application Priority Data

Jan. 18, 2000    (EP)    .................................. 00100954

(51) Int. Cl.
*G06F 12/14*    (2006.01)
(52) U.S. Cl. .................................... 713/189
(58) Field of Classification Search ........................ None
See application file for complete search history.

(56) References Cited

U.S. PATENT DOCUMENTS

| | | | | |
|---|---|---|---|---|
| 4,866,770 A | * | 9/1989 | Seth-Smith et al. | 380/212 |
| 4,944,008 A | * | 7/1990 | Piosenka et al. | 380/46 |
| 5,224,166 A | | 6/1993 | Hartman, Jr. | |
| 5,757,919 A | | 5/1998 | Herbert et al. | |
| 5,987,572 A | * | 11/1999 | Weidner et al. | 711/155 |
| 6,442,568 B1 | * | 8/2002 | Velasco et al. | 707/104.1 |
| 6,725,370 B1 | * | 4/2004 | Sakakura | 713/155 |

FOREIGN PATENT DOCUMENTS

| | | |
|---|---|---|
| EP | 0 583 140 A1 | 2/1994 |
| JP | 6-112937 | 4/1994 |

* cited by examiner

*Primary Examiner*—Brandon S Hoffman
(74) *Attorney, Agent, or Firm*—Dickstein, Shapiro, LLP.

(57) ABSTRACT

In a microprocessor configuration, data is temporarily stored in a cache memory or a register bank. A respectively assigned cryptographic unit ensures that the data is encrypted or decrypted when the cache memory or the register bank is accessed. The keyword which is used here is changed if the cache memory or the register no longer contains any valid data to be read out. As a result, an increased protection is obtained against unauthorized monitoring of data and program sequences.

18 Claims, 2 Drawing Sheets

MICROPROCESSOR CONFIGURATION AND METHOD FOR OPERATING A MICROPROCESSOR CONFIGURATION

CROSS-REFERENCE TO RELATED APPLICATION

This application is a continuation of copending International Application No. PCT/DE01/00018, filed Jan. 5, 2001, which designated the United States and was not published in English.

BACKGROUND OF THE INVENTION

Field of the Invention

The invention relates to a microprocessor configuration with a processing unit and a memory which is connected to the processing unit in order to execute a reading or writing access operation. The invention also relates to a method for operating a microprocessor configuration with such a memory.

Microprocessors require a memory in order to store in a permanent or volatile fashion data or programs which are to be processed. During the execution of the program, the microprocessor accesses the memory in order to load currently required program parts or data. Microprocessors are used, inter alia, in systems which are critical for security, for example in chip cards. The microprocessor is used there, inter alia, to encrypt data traffic or to execute other applications which are critical for security for the owner of the chip card. Here, data and programs which are critical for security are stored in the volatile and nonvolatile memory units of the microprocessor. In order to prevent this information from being monitored without authorization and displayed, such data is stored in encrypted form. The encryption method is relatively complex and requires a corresponding amount of expenditure on hardware and computing time during the reading and writing access operations to these memories.

The data which is to be processed at a particular time by the central processing and control unit (CPU) of the microprocessor is therefore buffered in further memories which can respond significantly more quickly. On the one hand, a cache memory is provided in which data which is to read out of the slower, encrypted memories or to be written into them is buffered. On the other hand, registers are provided in which data values or operational settings which are to be processed at a particular time are buffered.

As the information is to be made available, if possible, already in the next operating cycle when there is an access request to the cache memory or one of the registers, encryption of the buffered information there has previously not been considered. If conventional encryption methods were to be used for the encryption of the content of cache memories or registers, the response time would be too long. For this reason, hitherto the data has been buffered in cache memories and the working registers of the processor in plain text. It is a problem that the data can be monitored without authorization through the use of suitable measuring methods.

SUMMARY OF THE INVENTION

It is accordingly an object of the invention to provide a microprocessor configuration which overcomes the above-mentioned disadvantages of the heretofore-known microprocessor configurations of this general type and which protects stored data better against unauthorized monitoring. A further object of the invention is to provide a method for operating a microprocessor configuration with a memory.

With the foregoing and other objects in view there is provided, in accordance with the invention, a microprocessor configuration, including:
a processing unit;
a memory connected to the processing unit for executing a reading access operation or a writing access operation;
a cryptographic unit for encrypting and decrypting data values being written to or read from the memory; and
a device for providing a variable key, the device for providing a variable key being controlled such that a variable key is changed if the memory contains no data values to be read out.

In other words, the object of the invention is achieved through the use of a microprocessor configuration which includes: a processing unit, a memory which is connected to the processing unit for the execution of a reading or writing access operation; a cryptographic unit for encrypting and decrypting data values written or read into the memory; a device for providing a variable key, wherein it is possible to control the device in such a way that the key is changed if there are no longer any data values to be read out contained in the memory.

According to another feature of the invention, a further memory is operatively connected to the processing unit for storing data values in encrypted form; and a decryption device is operatively connected to the further memory, the decryption device decrypting data values read out from the further memory.

According to yet another feature of the invention, the memory is a cache memory.

According to a further feature of the invention, the cache memory has an access controller, the access controller checks whether the cache memory contains a data value of an access request from the processing unit and, if the cache memory contains the data value of the access request from the processing unit, the access controller causes the data value to be read out from the cache memory.

According to yet a further feature of the invention, a bus for handling data traffic is provided; a further memory for storing data values in encrypted form is provided, the further memory being connected to the processing unit via the bus; and the memory is connected into a data path between the bus and the processing unit.

According to another feature of the invention, the memory is a register including register cells which are embodied as bistable flip-flops.

According to another feature of the invention, logic operation elements are provided; the memory includes memory cells; lines for accessing the memory cells in the memory are provided; the device for providing a variable key includes a register having register outputs; and the register outputs are connected, via the logic operation elements, to the lines.

According to yet another feature of the invention, a random generator is connected to the register for feeding in the variable key.

According to a further feature of the invention, the register is configured to be loaded by the random generator when the processing unit is initialized for executing a further application.

With the objects of the invention in view there is also provided, a method for operating a microprocessor configuration having a processing unit and a memory connected to the processing unit for executing a reading access operation or a writing access operation, the method includes the steps of:

encrypting or decrypting data values in accordance with a key when the memory is accessed by the microprocessor configuration; and changing the key if the memory contains no longer any data values to be read out.

In other words, the object of the invention is achieved through the use of a method for operating a microprocessor configuration which contains a processing unit and a memory which is connected to the processing unit for executing a reading or writing access operation and in which, while the memory is being accessed by the microprocessor configuration, the data values are encrypted or decrypted in accordance with a key, and the key is changed if there is no longer any data to be read out contained in the memory.

Another mode of the method according to the invention includes the step of changing the key in a random-controlled manner.

A further mode of the method according to the invention includes the step of changing the key if the memory is completely read out.

Another mode of the method according to the invention includes the steps of changing the key if a program processed by the microprocessor configuration is changed.

In a microprocessor configuration according to the invention and in contrast to known microprocessor configurations, a cryptographic unit is additionally inserted into the access path to a memory, for example a cache memory or a register, which is connected to the processing unit. The key, which is used to operate the encryption and decryption, is changed. So that the reading into and out of the memory can be carried out with the same key; the key is changed only if there are no longer any data values to be read out contained in the memory. Because of the changing key, the encryption method itself can be relatively easy. The data is stored in the memory in a nonvolatile fashion so that, even after the supply voltage is switched off, there is no longer any useable information present, and repeated attempts at reading out are not successful. During operation, the available time for unauthorized monitoring of the key before a key change occurs is short. Overall, the combination of variable key with a simple encryption method provides sufficiently high protection against an attempt at monitoring.

The invention is particularly suitable in conjunction with a further, slower memory in which the data is stored with a hard, complex encryption. The data is buffered in the memory which is wired according to the invention in order to provide it quickly to the central processing unit of the processor. The further, hard-encrypted memories may be nonvolatile memories such as ROMs (Read-Only Memories) or E²PROMs (Electrically Erasable Programmable Read-Only Memories) or volatile RAMs (Random-Access Memories). In conventional process architectures, the CPU accesses these memories via a bus. With respect to this, the cache memory is located between the bus and the CPU. When the invention is applied to a register bank, the registers are connected directly to the CPU, as in the conventional way. The cache memory is characterized in that when there is an access request to a memory which is external, i.e. only accessible via the bus, it is firstly checked whether the cache memory contains a data value. If the data value is contained there, it is output to the processor from the cache memory, and not from the external memory. If the requested data word is not contained in the cache memory, the cache memory is first reloaded with the data value and a suitable environment of this data value, the requested data value is also output to the CPU. The cache memory contains for this purpose a memory field in order to be able to detect the presence of the requested data value. The memory cells of the memory cell field are static or dynamic memory cells. A register bank is characterized in that it contains a plurality of registers which can be addressed directly by the CPU. The registers provide, for example, operands for logic operations or status and configuration setting values to be processed in the CPU. The register cells are embodied as bistable flip-flops.

The safety expenditure for the encryption provides logic operation elements, expediently exclusive OR gates which are connected into the data lines in the access path of the memory. The data of the memory which is to be stored or read out is logically linked to a keyword through the use of exclusive OR gates. The keyword is made available by a register which contains the key which can vary from time to time. The keywords are preferably generated with random control. For this purpose, a random generator, which is connected at the output end to the key register, is used. The random generator provides the key in a physically random or pseudo-random way.

The random generator is then prompted to provide a new keyword if there is no longer any valid data present in the memory. This applies, on the one hand, if all the data read into the memory has already been read out. This also applies, on the other hand, if the processor is switched over to another application and re-initialized for this purpose. Conventionally, the content of the memory would then have to be completely deleted so that there is no longer any data from the previous application available for the following application. In the invention, it is no longer necessary to initialize the memory by resetting each memory cell. Instead it is sufficient to change only the key with random control. The data values contained in the memory can then no longer be encrypted. It is no longer necessary to reset each individual memory cell.

Other features which are considered as characteristic for the invention are set forth in the appended claims.

Although the invention is illustrated and described herein as embodied in a microprocessor configuration and a method for operating a microprocessor configuration, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
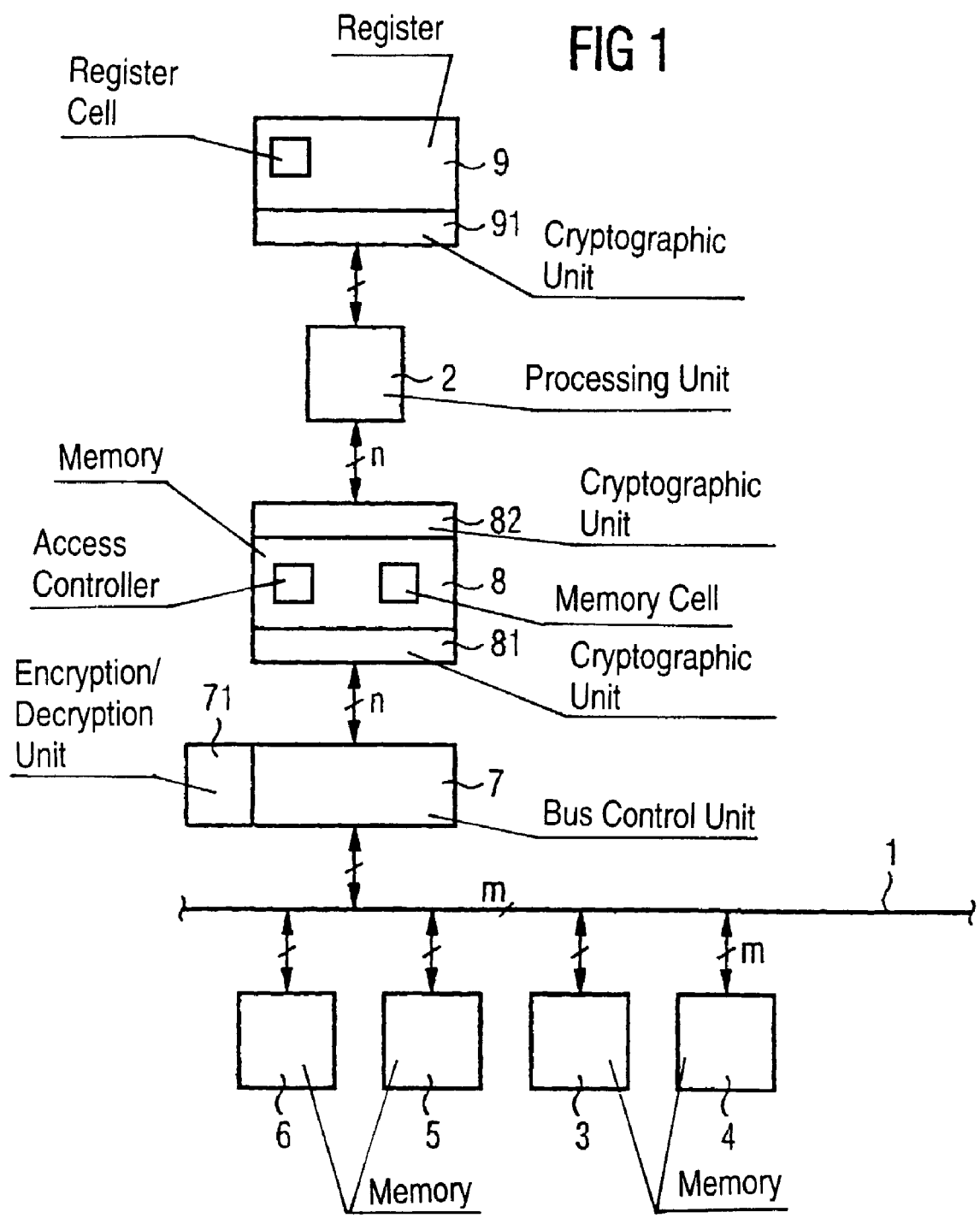
FIG. 1 is a block circuit diagram of a microprocessor according to the invention.

Referring now to the figures of the drawings in detail and first, particularly, to FIG. 1 thereof, there is shown a microprocessor which includes a data bus 1 via which the various functional units of the microprocessor exchange data, control or programming information with one another. The data bus 1 includes a plurality of lines for transferring the useful information and control information. A central processing unit 2 controls the program sequence and carries out calculations. Data and program information can be permanently stored in an invariable fashion in a ROM memory 3 or permanently stored in a variable fashion in an E²PROM (Electrically Erasable Programmable Read-Only Memory) 4. Volatile data is stored in a RAM (Random Access Memory) 5. In addition, at least one peripheral unit 6 is provided in order to receive data from the outside or output it to the outside. All functional units are arranged on a single integrated semiconductor chip. The units 2, . . . , 6 are all connected to the bus 1 and exchange the information to be processed via the bus 1. The access control to the bus is monitored by a bus control unit 7.

The data which is stored in the memories 3, 4, 5 is encrypted. When the data values are output onto the bus, the data is decrypted and passed on as plain text. For this purpose, a corresponding encryption and decryption unit 71 (MED=Memory En/Decryption) is used. When data values are stored in the RAM memory 5, the unit 71 carries out corresponding encryption. As the data contained in the memories 3, 4, 5 is available for a relatively long time in a volatile or nonvolatile fashion, the cryptographic method executed by the MED unit 71 is correspondingly complex. Memory access operations last a relatively long time. As an alternative to the central MED unit 71, each of the memories 3, 4, 5 can be directly assigned a cryptographic unit.

In order to speed up data access operations to the external memories 3, 4, 5, a cache memory 8 is provided. The cache memory 8 lies in the signal path between the bus controller 7 and the CPU 2. The data which is requested by the CPU 2 at a particular time and a suitable environment of this data are buffered in the cache memory 8. A read request to one of the memories 3, 4, 5 is processed in such a way that it is firstly checked in the cache memory 8 whether it contains the requested data. If not, the data and the corresponding environment are reloaded from the external memories into the cache. If the requested data is contained in the cache 8, the reloading is omitted.

In the exemplary embodiment, the cache memory 8 is divided into an instruction cache memory and a data cache memory. In the former, instruction sequences of the program which is being processed at that particular time are buffered, and in the latter the associated data. In principle, other structures for the cache memory are also possible. The cache memory can also be configured as a common cache for instructions and data (unified cache). In the case of associative cache memory architecture, such a unit is in turn divided into an associative memory for the addresses and the associated instruction/data storage part. By interrogating the associative memory, it is very quickly detected whether the requested data is contained in the cache. If the data item is not present (referred to as a cache miss), a request to reload is output to the corresponding external memory. Corresponding processes occur when a data value is written back into the RAM 5.

During the reloading of the cache memory 8, the information received via the bus 1 is encrypted in plain text through the use of a cryptographic unit 61. During a writing operation, the device 81 decrypts the data stored in encrypted form in the cache memory 8. When the data stored in encrypted form in the cache memory 8 is transferred to the CPU 2, it is decrypted by a cryptographic unit 82. During a writing operation, the unit 82 in the cache memory 8 encrypts information which is to be buffered. As described below, the key supplied to the cryptographic units 81, 82 is identical and is changed with random control if there is no longer any valid data to be read out in the cache memory 8.

Operators and status information for the CPU 2 are stored in a register bank 9. The CPU 2 can access directly and immediately one or more of the registers arranged in the register bank 9.

Data stored there-is encrypted or decrypted by a cryptographic unit 91 when one of the registers of the register bank 9 is accessed. The key used at a given time in the units 81 and 82 on the one hand and the unit 91 on the other is expediently different.

Figure 2:
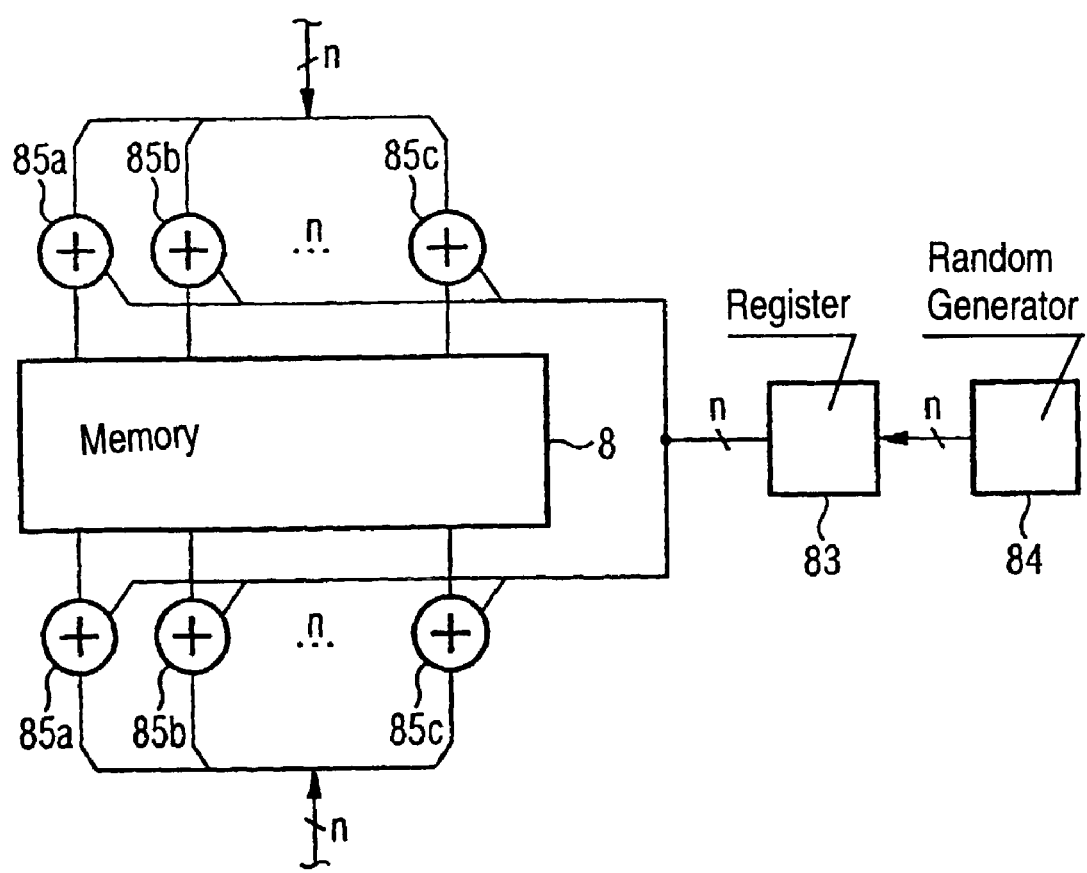
FIG. 2 is a block circuit diagram of a cache memory which shows details relevant to the invention.

The cryptographic units are illustrated in detail through the use of the example of the cache memory 8 in FIG. 2. A key register 83 contains the key which is being used at a given time. The key is provided by a random generator 84 which generates the keyword in a physically genuinely random or pseudo-random fashion. Respective exclusive OR gates 85*a*, 85*b* and 85*c* are connected into the data signal lines or bit lines which conduct the information written into or read out of the cache memory 8. Each of the exclusive OR gates 85 is in turn connected to an output of the register 83. The exclusive OR gates 85 are located both on the side of the cache memory 8 which faces the bus 1 and on the side of the cache memory 8 which faces the CPU 2. When data is read into the cache memory 8, encryption occurs owing to the exclusive OR operation performed on the data values with the keyword supplied from the register 83. In the case of reading out, the complementary decryption takes place through the use of the same exclusive OR logic operation with the same keyword. As long as valid data for reading out is stored in the cache memory 8, the keyword provided by the register 83 must remain the same without modification. Each of the n bit lines corresponds to one bit of the keyword.

According to the invention, the keyword is changed if the cache memory 8 does not contain any valid data, i.e. data which is still to be read out. The random generator 84 is then activated in order to calculate a new keyword which is generated with random control. There is no longer any valid data contained in the memory 8 if all data values stored there are read out again. Furthermore, the keyword is to be changed when an initialization of the cache memory 8 is performed, referred to as a cache flush. A cache flush occurs, for example, when there is a change in the program executed by the microprocessor if the application, i.e. the application case in which the microprocessor is used, changes. In this case, it is also possible to dispense with a cache flush and a complete initialization and resetting of all the memory cells of the cache memory 8 which is brought about by this as the data can in any case no longer be decrypted owing to a change of the keyword in the register 83.

The cryptographic unit 91 is constructed in detail in accordance with one of the cryptographic units in the access path to the cache memory 8. Its key register is then loaded with a new random value if all the registers of the register bank 9 no longer contain any valid data to be read out or have to be re-initialized.

As a result of the invention, increased protection against unauthorized monitoring is provided to temporarily stored data in that the data is stored in encrypted form and the key is changed from time to time. Even when there is a program sequence which repeats many times, the stored data is different owing to different keys. The current drawn from the microprocessor during the execution of the program, in particular the current peaks or current troughs, varies. As a result, attempts at unauthorized monitoring which apply an evaluation of the current profile are made more difficult.

We claim:

1. A microprocessor configuration comprising:
   a central processing unit configured to execute a reading access operation and a writing access operation;
   a memory coupled to said central processing unit;
   a cryptographic unit configured to encrypt and decrypt data values written to and read from said memory in accordance with a variable key; and
   a device configured to generate the variable key, wherein said device is controlled and further configured to change the variable key if said memory contains no valid data to be read out.

2. The microprocessor configuration according to claim 1, further comprising:
   a further memory operatively coupled to said central processing unit and configured to store data values in encrypted form; and
   a decryption device operatively coupled to said further memory, wherein said decryption device is configured to decrypt data values read out from said further memory.

3. The microprocessor configuration according to claim 1, wherein said memory is a cache memory.

4. The microprocessor configuration according to claim 3, wherein said cache memory comprises an access controller, wherein said access controller is configured to check whether said cache memory contains a data value of an access request from said central processing unit, and if said cache memory contains the data value of the access request from said central processing unit, said access controller configured to cause the data value to be read out from said cache memory.

5. The microprocessor configuration according to claim 1, further comprising:
   a bus configured to transfer data;
   a further memory configured to store data values in encrypted form, wherein said further memory is coupled to said central processing unit via said bus; and
   a data path between said bus and said central processing unit, wherein said memory is coupled to said data path between said bus and said central processing unit.

6. The microprocessor configuration according to claim 1, wherein said memory is a register, which includes register cells embodied as bistable flip-flops, wherein said register is directly accessible by the central processing unit.

7. The microprocessor configuration according to claim 1, further comprising:
   logic operation elements;
   memory cells arranged in said memory;
   lines provided to access said memory cells in said memory; and
   a register comprising register outputs, said register being arranged in said device,
   wherein said register outputs are connected, via said logic operation elements, to said lines.

8. The microprocessor configuration according to claim 7, further comprising a random generator connected to said register and configured to supply the variable key.

9. The microprocessor configuration according to claim 8, wherein said register is configured to be loaded by said random generator when said central processing unit is initialized to execute a given application.

10. The microprocessor configuration according to claim 7, wherein said logic operation elements are exclusive OR gates.

11. The microprocessor configuration according to claim 1, wherein said memory comprises a register that is directly accessible by the central processing unit.

12. A method for operating a microprocessor configuration, said microprocessor configuration having a central processing unit and a cache memory connected to the central processing unit for executing a reading access operation and a writing access operation, the method comprising:
   encrypting and decrypting data values in accordance with a key when the cache memory is accessed by the central processing unit; and
   changing the key for encrypting and decrypting data values if the cache memory no longer contains any data values to be read out.

13. The method for operating a microprocessor configuration according to claim 12, wherein the key changing step comprises changing the key in a random-controlled manner.

14. The method for operating a microprocessor configuration according to claim 12, wherein the key changing step comprises changing the key if the cache memory is completely read out.

15. The method for operating a microprocessor configuration according to claim 12, wherein the key changing step comprises changing the key if a program processed by the microprocessor configuration is changed.

16. The method for operating a microprocessor configuration according to claim 12, wherein the encrypting and decrypting step comprises applying the data and the key to exclusive OR gates.

17. The method for operating a microprocessor configuration according to claim 12, wherein said memory comprises a register that is directly accessible by the central processing unit.

18. A microprocessor configuration comprising:
   a central processing unit configured to execute a reading access operation and a writing access operation;
   a cache memory coupled to said central processing unit, said cache memory comprising memory cells having lines that provide access to said memory cells;
   a cryptographic unit configured to encrypt and decrypt data values written to and read from said cache memory in accordance with a variable key, wherein said cryptographic unit comprises exclusive OR gates; and
   a device configured to generate the variable key said device including a register that is configured to hold the variable key and comprises register outputs that are coupled, via said exclusive OR gates, to said lines,
   wherein said device is controlled and further configured to change the variable key if said cache memory contains no valid data values to be read out.

* * * * *